United States Patent [19]

Joy

[11] 4,389,466
[45] Jun. 21, 1983

[54] RAPIDLY REFUELABLE FUEL CELL

[75] Inventor: Richard W. Joy, Santa Clara, Calif.

[73] Assignee: The United States of America as represented by the United States Department of Energy, Washington, D.C.

[21] Appl. No.: 270,113

[22] Filed: Jun. 3, 1981

[51] Int. Cl.³ .................. H01M 8/02; H01M 8/18
[52] U.S. Cl. ............................... 429/27; 429/19; 429/66
[58] Field of Search ............... 429/27, 28, 29, 12, 429/17, 19, 66

[56] References Cited

U.S. PATENT DOCUMENTS

| | | | |
|---|---|---|---|
| 771,498 | 10/1904 | Roberts | 429/12 |
| 3,043,898 | 7/1962 | Miller et al. | 429/27 |
| 4,091,174 | 5/1978 | Ruch et al. | 429/27 |
| 4,317,864 | 3/1982 | Strasser | 429/36 |

FOREIGN PATENT DOCUMENTS

| | | | |
|---|---|---|---|
| 55-133761 | 10/1980 | Japan | 429/66 |
| 1223127 | 2/1971 | United Kingdom | 429/27 |

OTHER PUBLICATIONS

Cooper, Mechanically Rechargeable, Metal-Air Batteries for Automotive Propulsion, Proceedings of the 13th Intersociety Energy Conversion Eng. Conference, San Diego, CA, (20-25 Aug. 1978), pp. 738-744.

Primary Examiner—Donald L. Walton

[57] ABSTRACT

This invention is directed to a metal-air fuel cell where the consumable metal anode is movably positioned in the cell and an expandable enclosure, or bladder, is used to press the anode into contact with separating spacers between the cell electrodes. The bladder may be depressurized to allow replacement of the anode when consumed.

10 Claims, 7 Drawing Figures

RAPIDLY REFUELABLE FUEL CELL

GOVERNMENT RIGHTS IN INVENTION

The Government has rights in this invention pursuant to Purchase Order No. 5513309 under Contract W-7405-ENG-48 awarded by the U.S. Department of Energy.

FIELD OF THE INVENTION

This invention relates, in general, to electrochemical fuel cells of the type having a consumable electrode, thereby requiring periodic replacement of the consumed electrode (hereinafter referred to as refueling). In particular, this invention relates to fuel cells having a consumable reactive metal anode and an air-cathode, wherein the anode can quickly and easily be replaced, i.e., the cell is rapidly refuelable.

BACKGROUND OF THE INVENTION

For some time, a replacement for the internal combustion engine for vehicle propulsion has been sought. Fuel cells are one option under serious consideration. Such systems consume electrodes and, therefore, the consumed electrodes must be replaced from time to time if the cell is to continue to operate.

It is the object of this invention to provide a novel, extremely simple solution to fuel cell electrode replacement which results in a unique combination of advantages which are significant to the development of viable alternative transportation systems.

SUMMARY OF THE INVENTION

In accordance with this invention there is provided a rapidly refuelable fuel cell in which the electrodes and, in particular, the consumable anode, can be easily and quickly replaced. The fuel cell of this invention is a compact, light weight system which eliminates the need for the attachment of hardware or electrical connections to the anode, yet provides close electrode spacing and excellent electrical contact with the consumable metal anode at all times during the electrolytic reaction. The unique design of the fuel cell module results in complete consumption of the consumable metal anode, thereby fostering ease of replacement as discussed more fully hereinafter.

The fuel cells of this invention are conventional to the extent that each employs a cathode, a consumable reactive metal anode, an electrolyte, insulation and spacing disposed between the cathode and anode, means for collecting current from the cathode and anode, an electrolyte reservoir, with means for circulating the electrolyte between the cathode and anode, and means for removal of reaction by-products of the electrochemical reaction (and, in particular, the gaseous by-products). In addition, the fuel cell is provided with a means for accessing the electrodes for servicing and replacement. This is, generally, a removable cover on the cell housing, positioned so as to expose the anode and cathode upon removal of the cover.

The fuel cells of this invention are unique in that each incorporates the improvement comprising a movable anode disposed between said spacing means and an expandable enclosure, or bladder, provided with means for pressurization and depressurization. Said enclosure, upon internal pressurization, expands to apply an even pressure to said anode as said anode is consumed, thereby moving said anode to maintain it in constant contact with said spacing means. Upon depressurization, said enclosure contracts to provide an anode receptacle of said anode upon consumption thereof.

BRIEF DESCRIPTION OF DRAWINGS

The various features and advantages of the invention will become apparent upon consideration of the following description taken in conjunction with the accompanying drawings of the preferred embodiments of the invention. The views of the drawing are as follows.

DETAILED DESCRIPTION OF THE INVENTION

Figure 1:
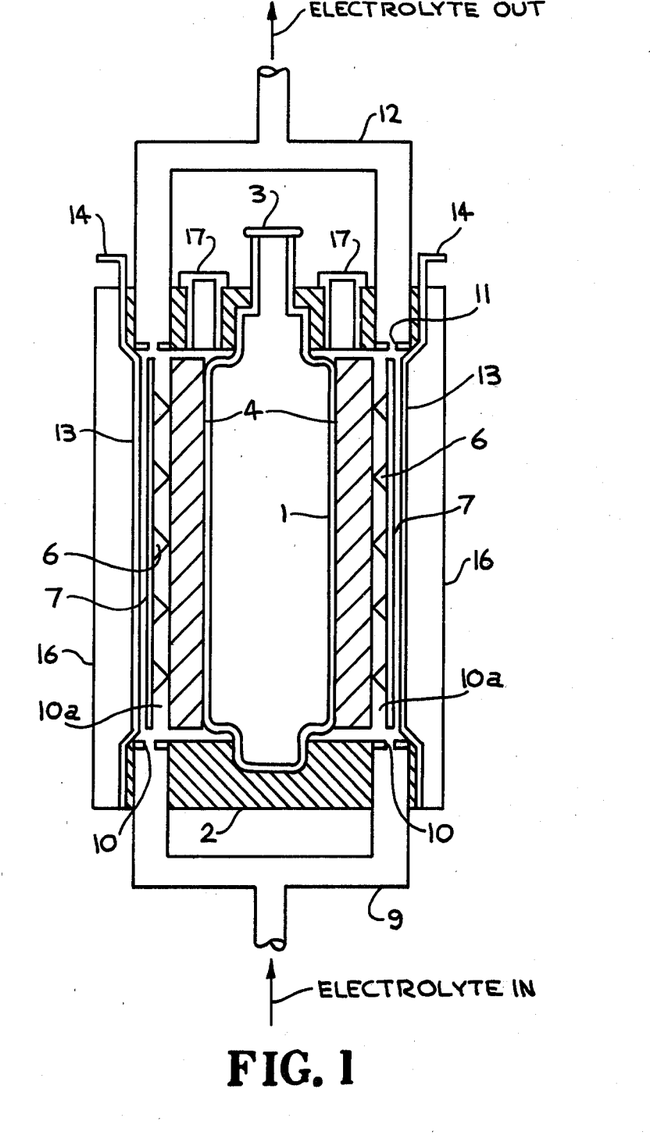
FIG. 1 is a cross-sectional view of a rapidly refuelable metal anode fuel cell having two sets of electrodes separated by a flexible bladder.
Figure 2:
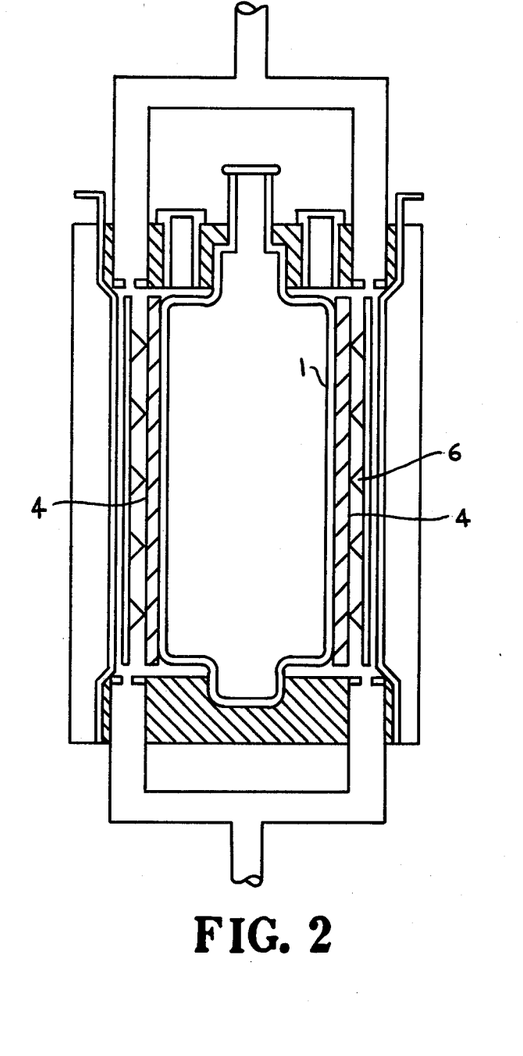
FIG. 2 is a cross-sectional view of said cell showing the bladder expanded and in contact with the metal anode.
Figure 3:
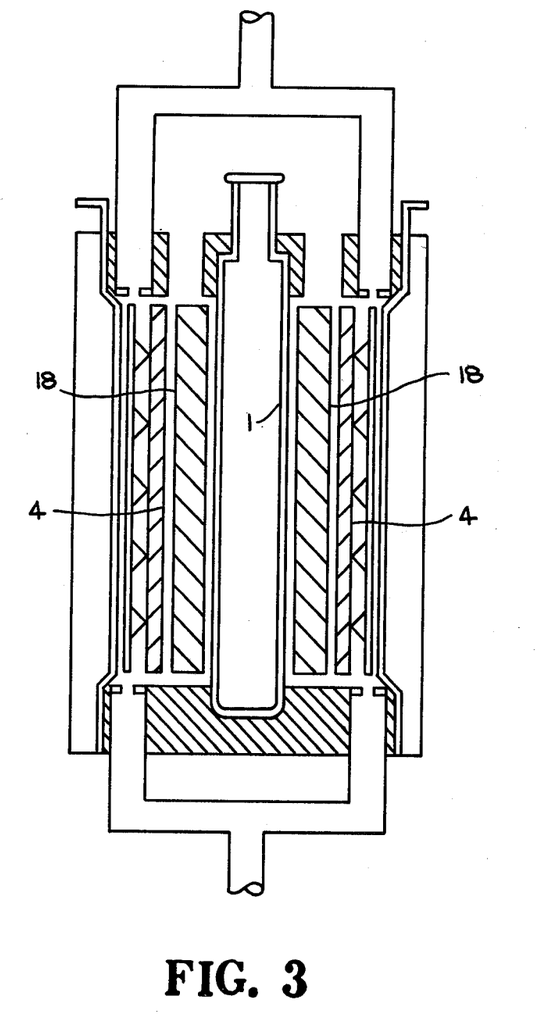
FIG. 3 is a cross-sectional view of said cell with the bladder deflated and showing the cell in its refuel mode.
Figure 4:
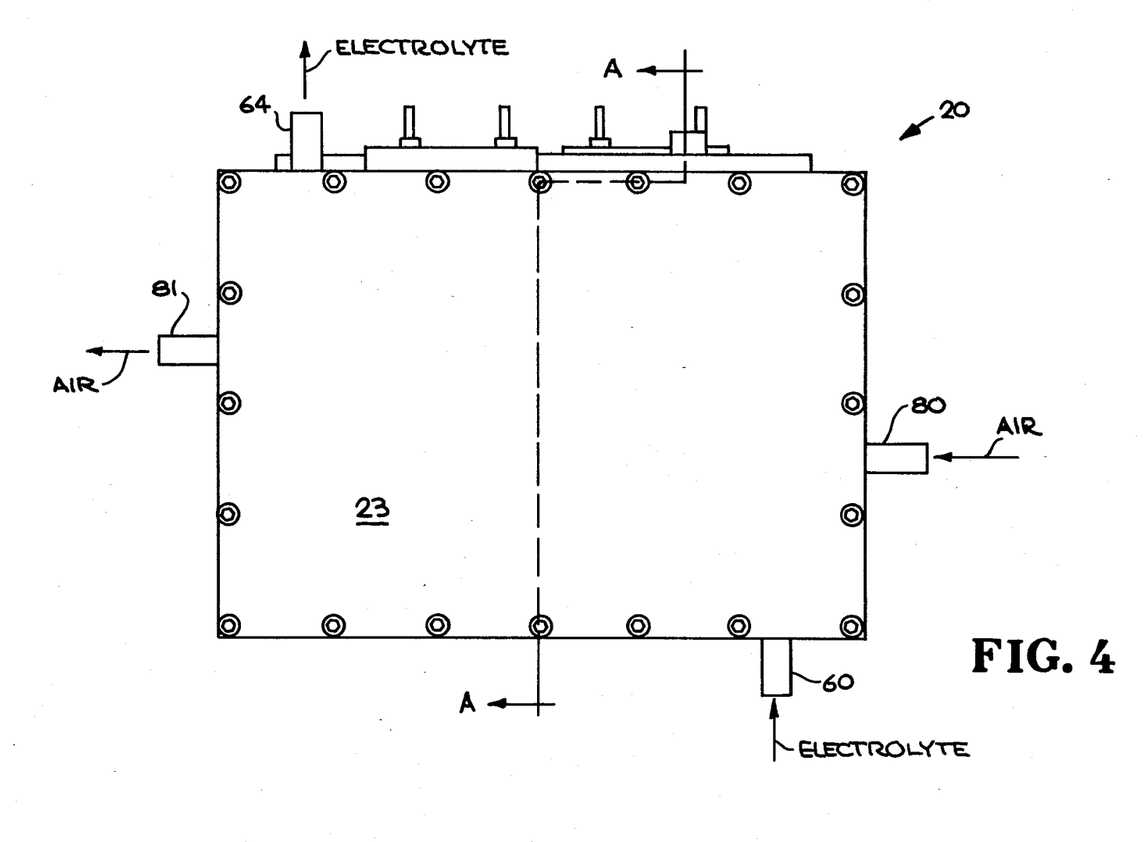
FIG. 4 is a side view of a preferred embodiment of a two-cell module of an electrochemical cell of this invention.
Figure 5:
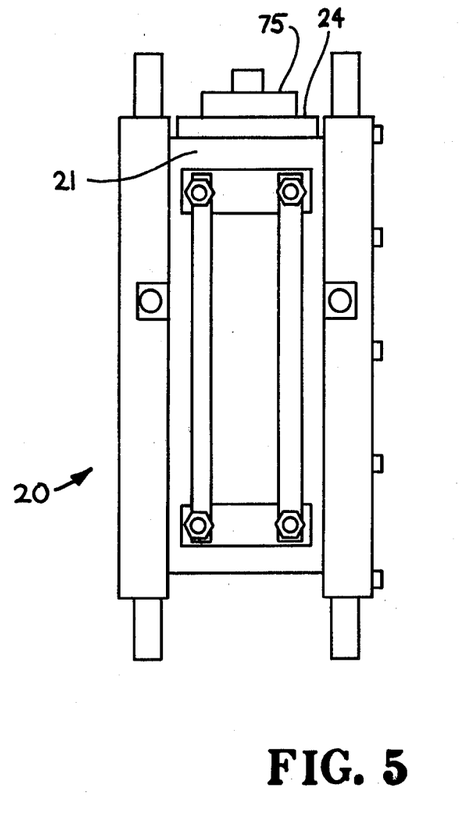
FIG. 5 is an end view and FIG. 6 a top view of this embodiment.

Referring now to FIGS. 1 through 3, where like reference characters designate corresponding parts throughout the several views, there is illustrated a rapidly refuelable metal anode fuel cell consisting of two sets of electrodes 4 and 7 separated by a flexible bladder 1. The bladder is located and retained in the cell body 2. The bladder, when inflated by gas or liquid through charging valve 3, applies equal pressure to the metal anodes 4, forcing contact with front current collector 6. The front current collector 6 maintains spacing between anode 4 and cathode 7. Electrolyte enters the lower plenum in manifold 9, passes through distribution slots 10, through channels 10a formed by current collector 6 through upper slots 11 into manifold 12 and exits cell. Flow is from bottom to top, so electrolyte will carry evolved gas out of the cell. Cathode frame 13 is mechanically fastened to voltage terminal 14. Removable cover 17 provides access for refueling cell with new metal anodes 4.

In FIG. 2 the bladder is maintaining contact between metal anode 4 and current collector 6 as the anode is consumed.

In FIG. 3 the bladder is deflated and cover 17 removed allowing new anodes 18 to be inserted behind original anodes 4.

The novel fuel cell of this invention provides the following unique combination of advantageous features:

1. New metal anode easily and quickly inserted;
2. Complete consumption of metal anode;
3. Simple metal anode with no attached hardware or electrical connections;
4. Compact lightweight system for maintaining close electrode spacing and electrical contact with metal anode;
5. Even pressure applied to full surface of metal anode;
6. When bladder is deflated to replace metal anode electrolyte level will drop so new metal anode can be installed without drawing electrolyte from cell;

7. Bladder can be pressurized with gas or liquid from independent source or attached to continuous pressure source such as a pressurized accumulator or pump, and 8. Body design allows stacking of cells for convenient constructing of power cells of various size and power ratings.

Referring now to FIGS. 4 through 7, where like reference characters designate corresponding parts throughout the several views, there is illustrated an especially preferred embodiment of a reactive metal cell formed in accordance with this invention, generally identified by the numeral 20. The cell 20 is in the form of a hollow housing and includes a body 21, an end plate (right side) 22, and end plate (left side) 23, and a removable top 24. These parts are formed of a suitable insulating material, such as a suitable plastic.

The cell 20 is provided with an internal recess 30 in which there is movably seated a pair of consumable metal anodes 31 which can be aluminum, zinc, lithium or other reactive metal suitable for a metal/air electrolytic reaction. Aluminum is preferred in the cell of FIG. 7. Each anode 31 is preferably in relatively thick sheet form and has side edges which are sealed, relative to the cell housing parts 21, 22 and 23, against the flow of electrolyte thereabout in a manner not shown and not forming a part of this invention. The anode can be moved forward and backwards.

Figure 7:
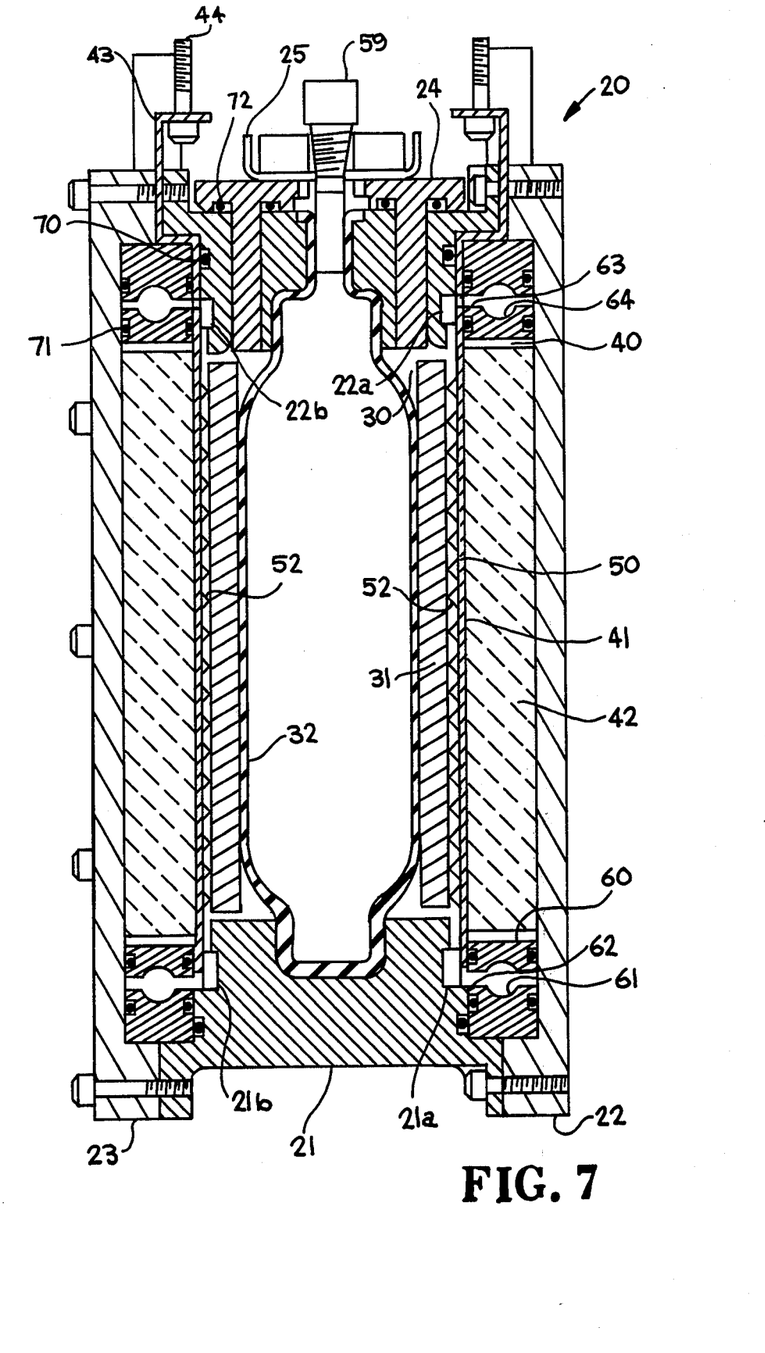
FIG. 7 is a cross-section of the module taken along line A—A of FIG. 4.

Disposed within the recess 30 behind the anodes 31 is an expandable member 32 which applies a constant pressure to the anodes 31 urging the same out of the recess 30. The expandable member may be of any suitable type which will expand upon pressurization with a gas or liquid and will contract upon depressurization by withdrawal of said gas or liquid. The expandable member 32 is illustrated, generally, in the form of a bladder made of, for example, neoprene.

The cell 20 is also formed with a recess 40 which is aligned with and located outwardly from recess 30. A suitable cathode 41, illustrated as a porous rigid air-cathode, is seated within the recess 40. The cathode 41 in accordance with the more specific aspects of the invention, is an air-cathode, wherein the cathode material is in the form of a suitably catalyzed Teflon bonded sheet backed by a porous rigid support 42, preferably a reticulated vitreous carbon (RVC) having a porosity range (pores per linear inch) of from about 8 to about 110 and preferably from about 8 to about 15. (These RVC's are available from the Fluorocarbon Company, Process Systems Division, Anaheim, California). RVC is available in a variety of standard thicknesses ranging from about $\frac{1}{8}''$ to about 12", all of which can be employed in this invention.

The anode 31 is separated from the cathode 41 by a combined current collector and separator 50. The combined current collector/separator 50 serves the multiple functions of (i) insulating and electrically separating said anode 31 from the cathode 41, (ii) promoting the efficient flow of the electrolyte across the face of the anode 31, and (iii) maintaining electrical contact with the anode 31 to collect the developed electrical current during operation of the fuel cell 20.

In the illustrated embodiment the combined current collector/separator 50 has a supporting frame 21a, 21b, 22a and 22b which defines an outline generally corresponding to the outline of recesses 30 and 40 and in alignment therewith. The supporting frame is recessed in grooves extending in parallel across part 21 of the housing 20.

The combined current collector/separator 50, in addition to including the above referred to supporting frame, has a plurality of ribs 52 extending in parallel relation across the opening defined by the frame. The ribs 52 are preferably formed integrally with the supporting frame so that the supporting frame may function as a bus-bar. Each rib, 52 has a flat side which bears against the cathode 41 and, projecting at spaced intervals therefrom are triangular points the apexes of which bear against the anode 31. The flat base of each rib 52 opposes the cathode 41, while the points engage and generally dig into the adjacent face of the anode 31 so as to make good electrical contact therewith. Thus, the ribs 52 collect the developed current and transfer it to the supporting frame 21a, 21b, 22a and 22b so as to provide for the collection of current and the utilization of said frame as a bus-bar.

It is to be understood that since the anode 31 is constantly urged against the points of the ribs 52, the points of the ribs 52 will slightly dig into the face of the anode and make good electrical contact therewith.

Electrolyte is directed across the face of the anode 31 generally parallel to the ribs 52, with the spaces between adjacent bars defining electrolyte flow passages.

Since the combined current collector/separator 50 has electrical contact with the anode 31, it must be insulated relative to the cathode 41. Accordingly, there is an insulating layer on that side of the combined current collector/separator 50 which opposes the cathode.

The combined current collector/separator is generally constructed in such a manner as to inhibit hydrogen evolution to the maximum extent. It is usually desired to maintain the exposed surface area of the current collector/separator at a minimum. The surface contact area between the anode and the current collector/separator should be adequate to provide a low resistance connection between the anode and the current collector/separator.

However, where the current collector/separator is formed of a material with high hydrogen overvoltage, i.e., one which resists discharging of hydrogen from the electrolyte, the metal may be used bare. At the same time, the material of the current collector/separator should be of such nature as to avoid plating out of undesirable films thereon during active use.

It has been found that suitable materials for the formation of the collector/separator include beryllium, copper alloy, nickel, lead, a hard lead alloy, and a lead amalgam which includes in addition to the lead, silver and mercury.

It is also highly desirable with particular anode materials, as for example, lithium, that there be provided turbulence within the electrolyte so as to prevent the build-up and maintenance of an oxide layer on the face of the anode. The turbulence of the electrolyte can be effected in any desired manner.

It is also desirable to constantly shift the area of contact between the bars or needles and the anode so that there may be uniform erosion of the anode over the entire surface of the active face thereof. For example, a vibrator or other type of activator capable of shifting the current collector 50 can be provided.

The preferred slope angle of the bars or ribs is 60°, but other angles may suffice. It is also pointed out that a typical bar would have a base width on the order of 0.030 inch. Other than triangular cross-sectional configurations may also be employed. For example, a hemispherical or rectangular cross-section wherein a rounded or rectangular edge can be used to contact the anode 31.

Again, referring to FIG. 7, the expandable member 32 can be pressurized with gas, a liquid from an independent source, through charging valve 59. Alternatively, said member can be attached to a continuous pressure source such as a pressurized accumulator or pump.

The cathode 41 is connected to a cathode support plate 43 which is mechanically fastened to a voltage terminal 44.

In operation of the fuel cell of FIG. 7, electrolyte enters the manifold 60 and flows through the channel 61 formed by the outer walls thereof. The electrolyte passes through the distribution slots 62, through channels formed by the bars 52 of the current collector 50, through upper distribution slots 63, into manifold 64 and exits cell. Air enters the cell 20 through inlet port 80, passes through the air-cathode 41 and exits through outlet port 81 (see FIG. 4).

Figure 6:
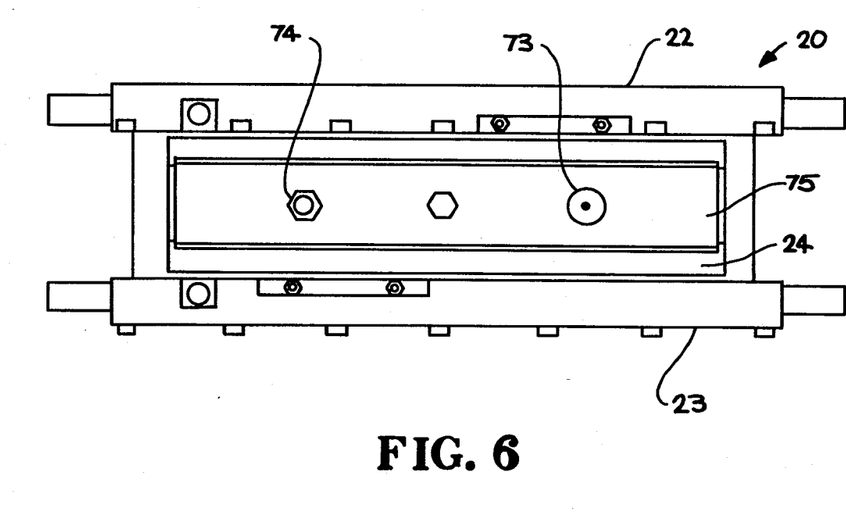

The remaining parts shown in FIG. 7 do not form a part of this invention and are here set forth for purposes of clearer understanding of the preferred embodiment illustrated herein. Parts 70, 71, and 72 are seals, generally, of the neoprene O-ring type. In FIG. 6 part 73 is a relief valve, 74 is a Shrader valve and 75 is a bridge plate.

EXAMPLE 1

A battery cell was assembled as shown in FIG. 7. The bladder was made of neoprene rubber and pressurized at 1 psi with air. The thickness of the bladder walls varied from 0.030 to 0.125 inches. The thicker sections were located in the wall of the bladder in contact with the body 21 as depicted in FIG. 7. The aluminum anode had a surface area of 50 $cm^2$. A current collector/separator was made of beryllium copper with teeth 0.062 high and coated entirely with epoxy except for the tip of the teeth. An air-cathode manufactured by the Electromedia Corporation (Englewood, N.J.) was used with an air flow of 5 SCFH and a pressure of 28 inches water. Electrolyte consisting of 4 M NaOH in which had been dissolved 1 M aluminum and 0.06 M sodium stannate. The electrolyte was flowed between the anode and cathode at a rate of 5 gph. A current of 100 mA per sq. cm of anode area was generated at the cell voltage of 1.50 V.

In metal/air batteries using an air-cathode, one typically encounters difficulties with placement of the air-cathode which is generally fragile and difficult to handle. Also, it is difficult to achieve uniformity of air flow throughout the cathode system with suitable turbulence to effect convective mixing to assure suitable contact with the cathode for effective reaction.

Generally, the air-cathode material is a mixture of carbon particles bonded with Teflon to create a fabric-like structure in sheet form resembling cloth or paper and having high resistivity. These sheets are fragile and difficult to handle in the environment of a fuel cell. Because of the high resistivity, significant voltage drops are encountered across the face of the cathode. One method of overcoming this problem is to embed the cathode material in a nickel screen to achieve rigidity and conductivity. Because of the cost of nickel, this is an expensive solution which is not conducive to commercial applications where cost is a factor. In an embodiment of this invention there is provided an alternative, low cost solution to the foregoing problem employing a unique support for the air-cathode.

In accordance with this embodiment, there is provided an air-cathode in combination with a porous rigid support having specific characteristics. This combination results in peformance improvement and extended life of the metal/air battery.

The air-cathode of this invention comprises a suitably catalyzed carbon-Teflon composition in the form of flexible sheets having a porosity size ranging between 1 and 100 mils. There are several active carbons and carbon papers available which fulfill the requirements of a low cost electrode. Various facrication techniques have been devised and used successfully. See, for example, Kordisch and Scair, "Low Cost Oxygen Electrodes," July, 1973, e.g., pages 1–12 (available from National Technical Information Service, U.S. Department of Commerce under Document Contract No. AD-769905).

The rigid porous supports of this invention comprise either a conductive or non-conductive porous material having suitable porosities to permit the passage of air or oxygen without any significant pressure drop and sufficient rigidity to resist crushing primarily due to the pressure differential between the electrolyte and air cavities of the metal/air battery. Exemplary of such materials are reticulated vitreous carbon (RVC), foam metals, foam plastics and other conductive or non- conductive materials having the foregoing characteristics.

RVC is a preferred support material. Exemplary are those RVC's commercially available from The Fluorocarbon Company, Process Systems Division, Anaheim, California, sold under the product description Reticulated Vitreous Carbon in porosity grades 10, 30, 45, 60, 80, 100 having standard thicknesses ranging from $\frac{1}{8}''$ to 12".

Employment of this invention in metal/air cells of the air-cathode type results in performance improvements involving significantly improved current distribution and lowered resistivity losses, and overall general improvement of the life of the system as well as the efficiency thereof. In certain embodiments of this invention conductivity can be significantly improved through the employment of plating techniques upon the porous support whereby conductive metals such as nickel/copper can be employed to increase overall cathode conductivity.

I claim:
1. A refuelable electrochemical fuel cell comprising:
   a housing defining a chamber therein and having a removable cover,
   at least one air-cathode positioned within said chamber of said housing,
   an expandable and contractable member positioned within said chamber of said housing,
   at least one consumable reactive metal anode movably positioned within said chamber of said housing and located intermediate said member and said air-cathode, said consumable anode having a sheet-like configuration and positioned in said chamber such that a peripheral edge of said anode is adjacent said removable cover of said housing,
   current collector means positioned within said chamber of said housing and located intermediate said anode and said air-cathode,
   means for directing electrolyte through said housing intermediate said anode and said air-cathode, and means for causing expansion and contraction of said member, whereby expansion of said member applies an even pressure to said anode causing said anode to be moved toward said air-cathode and to maintain said anode in constant contact with said current collector means during consumption of said anode, and whereby contraction of said member allows placement of a new consumable anode in said housing via said removable cover.

2. The fuel cell of claim 1, additionally including means for directing air flow past said air-cathode.

3. The fuel cell of claim 1, wherein said expandable and contractable member consists of a flexible bladder, and wherein said means for causing expansion and contraction of said member includes a pressure means for inflating and deflating said flexible bladder.

4. The fuel cell of claim 1, wherein said means for directing electrolyte through said housing includes a first manifold located at a lower end of said housing, a second manifold located at an upper end of said housing, and means for causing said electrolyte to flow into said first manifold upwardly through said housing, and out via said second manifold, whereby said electrolyte carries with it any gas generated in said housing by the consumption of said anode.

5. The fuel cell of claim 1, wherein said current collector means additionally functions as a spacer between said anode and said air-cathode.

6. The fuel cell of claim 5, wherein said current collector means constitutes a combined current/separator assembly and includes:
a supporting frame,
a plurality of ribs spaced along said supporting frame, and
insulating means positioned intermediate said supporting frame and said air-cathode.

7. The fuel cell of claim 6, wherein said plurality of ribs are constructed as triangular members with the apexes thereof being in contact with said anode.

8. A refuelable electrochemical fuel cell comprising: a housing having a removable cover, a pair of air-cathodes positioned in said housing adjacent opposite walls of said housing, an expandable and contractable member positioned within said housing, a pair of consumable reactive metal anodes movably positioned in said housing and placed on opposite sides of said housing intermediate said expandable and contractable member and said air-cathodes, a pair of current collector means positioned within said housing and located intermediate said anodes and said air-cathodes, means for directing electrolyte through said housing intermediate said anode and said air-cathode, and means for causing expansion and contraction of said member, whereby expansion of said member applies equal and even pressure to all areas of said anodes causing said anodes to be moved toward said air-cathodes and forcing even and constant contact of said anodes against said current collector means during consumption of said anodes, whereby contraction of said member allows placement of a new consumable anode in said housing via said removable cover.

9. The fuel cell of claim 8, wherein said consumable anodes are constructed in the form of a sheet.

10. The fuel cell of claim 8, wherein said expandable and contractable member consists of a rubber bladder, said means for expansion and contraction of said member includes a pressurized air supply operatively connected to said bladder, said consumable anodes being constructed of aluminum, and said current collector means each includes a current collector member made of beryllium copper and provided with a plurality of spaced ribs for contacting said anodes.

* * * * *